June 26, 1962  S. S. BRODY  3,040,567
V-G FLIGHT INDICATOR
Filed June 27, 1955  2 Sheets-Sheet 1

INVENTOR.
STANLEY S. BRODY
BY
Louis B. Applebaum
ATTORNEYS

INVENTOR.
STANLEY S. BRODY

3,040,567
V-G FLIGHT INDICATOR
Stanley S. Brody, 1814 E. 16th St., Brooklyn, N.Y.
Filed June 27, 1955, Ser. No. 518,423
5 Claims. (Cl. 73—178)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft instrumentation and more specifically to an instrument that determines and indicates the attitude or zone of operation of an airplane relative to the angle of attack vs. Mach number graph of the airplane to indicate directly the safe, critical or unsafe operating conditions of an airplane.

The safe operation of high speed aircraft is critical. Such aircraft must be operated below specified maximum limits of acceleration (G) and indicated airspeed (V), the value of either one being dependent upon the value of the other and the maximum permissible acceleration values, for each value of indicated airspeed, being represented on a graph. For accurate results, the graph must be corrected for the altitude of flight and the weight of the aircraft. The area below the acceleration vs. indicated airspeed graph represents the safe flying conditions, and it is imperative that the pilot does not exceed the limits as defined by said graph. Thus, it becomes obvious that at every instant of flight, the pilot must calculate his position relative to the acceleration vs. indicated airspeed graph by utilizing the four variables of altitude, weight, acceleration, and indicated airspeed. If a pilot exceeds the limits of a corrected graph, his airplane will either stall, be subjected to forces that exceed its structural limitations, or be subjected to airframe buffet with the possibility of structural failure.

Presently, a pilot must read three separate instruments to determine acceleration, indicated airspeed, and altitude. He then calculates the gross weight of the airplane and utilizing said four items of information, determines whether the airplane is in a safe, critical or unsafe region of said graph.

The present invention relates to a single aircraft instrument that indicates instantaneously the position of the airplane relative to its angle of attack vs. Mach number characteristic to indicate directly the safe, critical or unsafe operation of an airplane. Thus, this invention reduces considerably the work the pilot must perform; and indicates instantly and directly the area of operation of the airplane relative to the angle of attack vs. Mach number graph.

In the present invention, the acceleration vs. indicated airspeed graph is replaced by an equivalent curve of angle of attack vs. Mach number. The shape of this curve or graph varies for each type of airplane. A Mach meter is modified to drive a voltage varying means such as a potentiometer to generate a voltage output that varies in accordance with the Mach number curve. The angle of attack system is modified to generate a voltage that is linear and proportional to the angle of attack value. The voltage output of the angle of attack system is compared in a servo system with the voltage output of the Mach meter and its associated potentiometer, and the difference is utilized to activate a servo motor. At every position of zero input, the separation between the critical and unsafe portion of the airplane attitude, relative to the graph, is represented. When the angle of attack output voltage is larger than the Mach varied signal representing the maximum safe angle of attack, the servo moves to a positive position, and the unsafe region of the curve is represented. When the Mach varied output voltage is larger than the angle of attack output voltage, the servo moves to a negative position and the safe or critical region is represented. A synchro transmitter is coupled to the shaft of the servo, and is coupled to feed its output to a synchro receiver to orient the needle of an indicator.

The principal object of this invention is to provide a device that indicates on a single scale the discrete combination of the two variables of angle of attack and Mach number to indicate the safe, critical or unsafe operation of an aircraft to prevent stalling, buffeting or structural failure.

Another object is to provide a single instrument that combines the two variables of angle of attack and Mach number to show automatically, accurately and quickly the position of the aircraft relative to an angle of attack vs. Mach number graph.

An additional object is to provide a single aircraft instrument that is light in weight, and indicates directly, accurately, and automatically, the safe, critical, or unsafe zone of operation of an aircraft.

Other objects and many of the attendant advantages of this invention will readily be appreciated as the same becomes better understood by reference to the following detailed description when considered in connection with the accompanying drawings wherein.

Similar numerals refer to similar parts throughout the several views.

Figure 2:
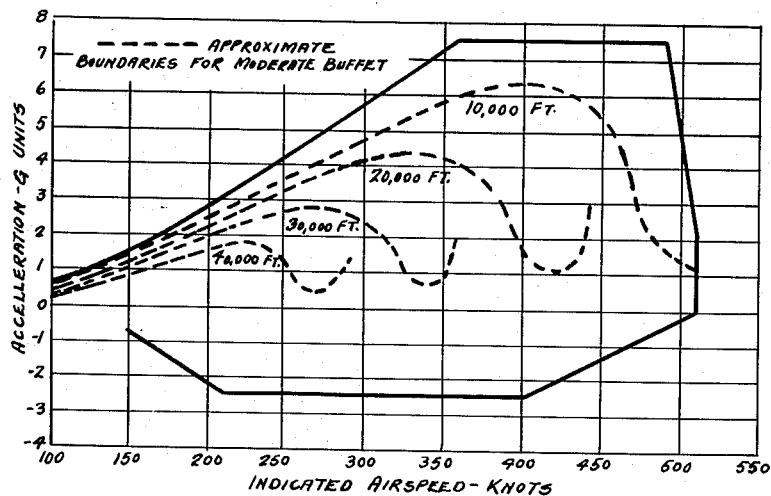
FIG. 2 is an operating flight strength diagram wherein the values of acceleration are plotted against indicated airspeed for various altitudes to indicate the zone of stall, buffet, and structural limitations.

The operating flight strength diagram shown in FIG. 2 is a typical V-G diagram of an aircraft having a gross weight of 18,600 pounds or less. As indicated, the structural limits in smooth air are a positive 7.5 g and a negative 2.5 g. The solid diagonal line extending from 1.5 g at 150 knots indicated airspeed indicates the stalling speeds under accelerated flight. For example, at 300 knots IAS (indicated air speed) the aircraft will stall if subjected to 5.7 g's. Thus, at airspeeds below 360 knots IAS, it is impossible to exceed the structural limitations, since the airplane will stall first. However, at airspeeds above 360 knots IAS, the structural limits can be exceeded. A similar analysis can be drawn from the lower solid line, which indicates negative accelerations.

The dash lines of FIG. 2 indicate airspeed and acceleration combinations at various altitudes at which mild airframe buffet will be encountered. Accelerations above those producing buffet should be avoided. For example, at 20,000 feet altitude and 250 knots IAS, airframe buffet will be encountered at 3.2 g's, which is the maximum permissible acceleration for that airspeed and altitude. As gross weight is increased above 18,600 pounds, the permissible accelerations decrease.

Figure 3:
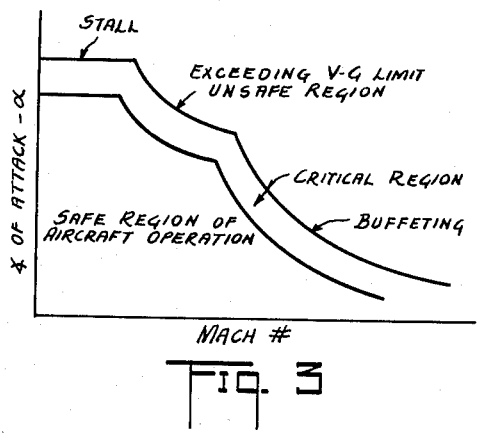
FIG. 3 is a graph of angle of attack vs. Mach number indicating the safe, critical and unsafe regions and the stall, buffeting and structural failure areas.
Figure 4:
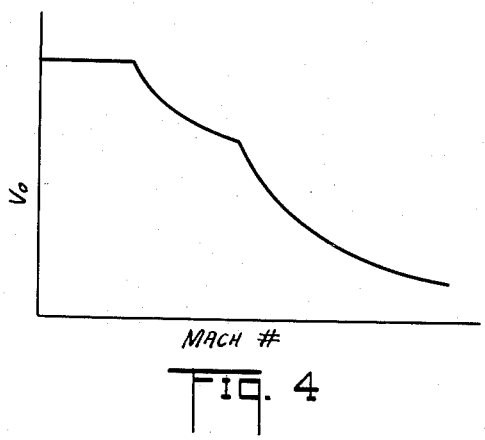
FIG. 4 is a graph of the voltage output of the Mach meter for various Mach numbers.
Figure 5:
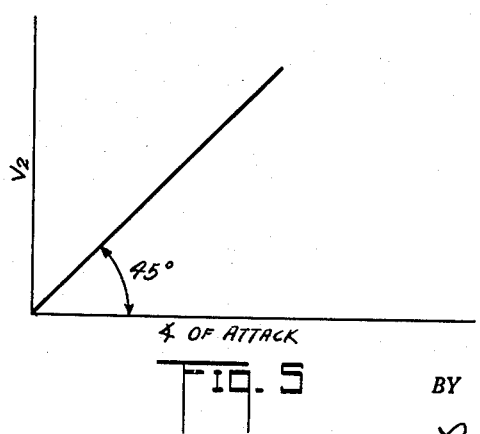
FIG. 5 is a graph of the variation of voltage with change of angle of attack.

The entire V-G diagram as shown in FIG. 2 can be replaced by plotting for all values of Mach number of which the aircraft is capable of attaining, the maximum angle of attack at which the aircraft may be safely operated without it stalling, being subject to forces that exceed its structural limits, or being subjected to airframe buffet with the possibility of structural failure. FIG. 3 is a typical example of such a plot which in addition to indicating the maximum values of angle of attack also shows a second series of values of angle of attack to define the boundaries of a critical region below the maximum level of operation and thus divides all possible angle of attack into three categories of operation—safe, critical and unsafe. It should be noted that the curve shows the characteristics of only one aircraft and that the characteristics shown vary from one aircraft to another. The present invention utilizes voltages proportional to the angle of attack and Mach number to indicate upon a meter the information illustrated graphically in FIG. 3. These voltages are generated in the following manner: The rotor shaft of a conventional Mach meter 24 operates a micro-torque potentiometer. This potentiometer 22 is fabricated to produce a voltage analog of the maximum angle of attack as a function of the Mach number curve of FIG. 3. FIG. 4 shows the output of this potentiometer as a function of Mach number and the Mach number as is measured by the Mach meter. A second micro-torque potentiometer is positioned by an angle of attack indicating system. This positioning may be accomplished by any conventional means, such as gearing to a suitable shaft in said system or such as a servo system. Said second micro-torque potentiometer provides a voltage output $V_2$ that is linear with respect to the angle of attack (denoted by the Greek letter "alpha" $\alpha$), as shown in FIG. 5. The voltage applied across the potentiometer resistances may be a 400 cycle A.C. voltage since this is a commonly available supply in aircraft.

Figure 1:
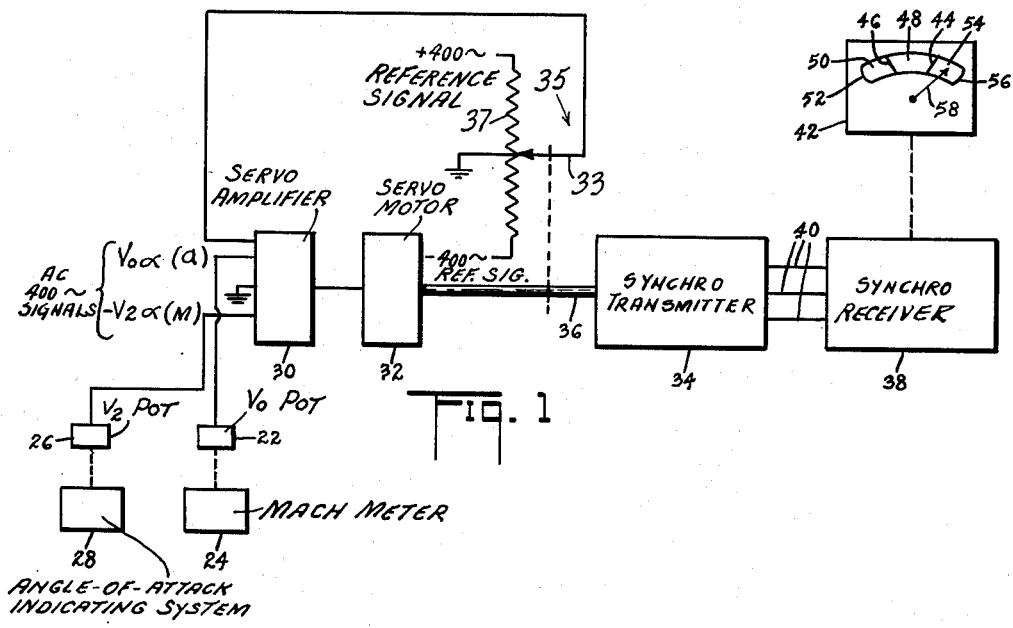
FIG. 1 is a block diagram of the flight indicator system showing a standard servo system coupled to receive and compare the Mach meter voltage and the angle of attack meter voltage.

The output voltage $V_2$ of the micro-torque potentiometer 22 that is positioned by the Mach meter 24 is compared to the output voltage $V_0$ of the micro-torque potentiometer 26 that is positioned by the angle of attack indicating system 28. Said comparison is performed in a servo amplifier 30 and the difference between $V_0$ and $V_2$ is utilized to position a servo motor 32. The wiper arm 33 of the potentiometer 35 mounted on the shaft 36 of the motor is positioned by the motor 32. The winding 37 of this potentiometer is center tapped to ground and powered at its two extremities by 400 cycle voltage sources, one in phase with $V_0$ and the other 180° out of phase with it. Thus, the voltage tapped off by the wiper arm is dependent on the arm's position in relation to the center tap. This voltage is fed back to the servo amp to reduce the difference between $V_0$ and $V_2$ to zero as the shaft 36 is positioned in response to this difference so that when the voltage equals the difference the output of the servo amp will be zero and the motor 32 will stop. A synchro transmitter 34 is positioned by the servo motor 32 through the shaft 36. A synchro receiver 38 is coupled electrically to said transmitter 34 through the conductors 40 to indicate the safe, critical, or unsafe area of operation of the aircraft as indicated by the V–G curve. Whenever the input to the servo amplifier is zero (when the voltage $V_2$ is equal to the voltage $V_0$) the boundary between the critical and the unsafe zones of operation is generated and the servo motor assumes a predetermined position. When the voltage $V_2$ is larger than the voltage $V_0$, the synchro receiver is oriented to indicate an unsafe region of operation. When the voltage $V_2$ is smaller than the voltage $V_0$, the synchro receiver is oriented to indicate the safe or critical region of operation. For a basic discussion of servomechanisms see, for example, "The Principles of Computer Simulation," NAVEXOS P–1248, published by the U.S. Naval Training Device Center, Port Washington, New York. FIGS. 3–4 on page 45 of this manual show a type of servomechanism which could be used herein with minor alteration. One additional input resistor would be required in the error detector for the second input potentiometer which is employed in the present device. It should be noted that the servo amplifier 30 of the present device is an inclusive term which covers both the error detector network and the controller circuit in the system illustrated in FIG. 1.

An indicator 42 having a pointer 58 that is driven by the synchro receiver 38 shows the instantaneous area of operation of the aircraft relative to its V–G diagram. A line 44 on the face of the indicator 42 represents all the points wherein the voltage $V_0$ equals the voltage $V_2$. Located at a discrete distance to the left of line 44 is a second line 46. The zone 48, bounded by said lines 44 and 46, represents the buffer or critical region, and can be as wide as desired. In this zone, the voltage $V_0$ is greater than the voltage $V_2$. A zone 50, bounded by the line 46 and another line 52, represents the totally safe region. For said zone 50 the voltage $V_0$ is also greater than the voltage $V_2$. The zone 54 bounded by the line 44 and another line 56 represents the totally unsafe region. In this latter zone, the voltage $V_0$ is less than the voltage $V_2$.

One of numerous variations of this invention substitutes a D.C. summing amplifier for the servo amplifier 30, servo motor 32, synchro transmitter 34 and synchro receiver 38, and a zero-center type D.C. indicator for the indicator 42. The input voltages $V_2$ and $V_0$ would then be positive and negative D.C. potentials.

Obviously many modifications and variations of the present invention are possible in the light of the above teachings. It is therefore to be understood that within the scope of the appended claims the invention may be practiced otherwise than as specifically described.

I claim:

1. A V–G flight indicator for determining safe operating conditions for aircraft comprising an angle of attack means producing a signal proportional to the angle of attack of the aircraft, a maximum safe angle of attack means producing a signal variable with the aircraft speed and proportional to the maximum safe angle of attack of the aircraft at the speed at which the aircraft is moving as determined by stall, maximum load limitation, and buffeting, difference means coupled to said angle of attack means and said safe angle of attack means producing a signal proportional to the difference between the maximum safe operating angle of attack and the angle of attack of the aircraft, and indicating means coupled to said difference means producing an indication of the difference between the maximum safe operating angle of attack and the angle of attack of the aircraft so that the pilot of the aircraft can easily determine whether the aircraft's operation is safe, critical or unsafe with reference to the aircraft's V–G characteristics.

2. The structure of claim 1 wherein said indicating means includes a dial face divided into safe, critical and unsafe areas with a dial disposed in front of the dial face indicating by its position with relationship to the face areas the safe or unsafe operation of the aircraft with reference to the aircraft's V–G characteristics.

3. A V–G flight indicator for determining safe operating conditions for aircraft comprising an angle of attack means producing a signal proportional to the angle of attack of the aircraft, a variable maximum safe angle of attack means producing a signal variable with the aircraft speed and proportional to the maximum safe angle of attack of the aircraft at the speed at which the aircraft is moving, difference means coupled to said angle of attack means and said safe angle of attack means producing a signal proportional to the difference between the maximum safe operating angle of attack and the angle of attack of the aircraft, and indicating means coupled to said difference means producing an indication of the difference between the maximum safe operating angle of attack and the angle of attack of the aircraft so that a pilot of an aircraft can easily determine whether the aircraft's operation is safe, critical or unsafe with reference to the aircraft's stall, V–G limit and buffeting characteristics.

4. A V-G flight indicator for determining safe operating conditions for aircraft comprising an angle of attack means producing a signal proportional to the angle of attack of the aircraft, a Mach varied maximum safe angle of attack means producing a signal proportional to the maximum safe angle of attack of the aircraft at the speed at which the aircraft is moving, difference means coupled to said angle of attack means and said safe angle of attack means producing a signal proportional to the difference between the maximum safe operating angle of attack and the angle of attack of the aircraft, and indicating means coupled to said difference means producing an indication of the difference between the maximum safe operating angle of attack and the angle of attack of the aircraft so that the pilot of the aircraft can easily determine whether the aircraft's operation is safe, critical or unsafe with reference to its stall, V-G limit and buffeting characteristics.

5. The structure of claim 3 wherein said indicating means includes a dial face divided into safe, critical and unsafe areas with a dial disposed in front of the dial face indicating by its position with relation to the dial face areas the safe or unsafe operation of the aircraft with reference to the aircraft's V-G, stall and buffeting characteristics.

References Cited in the file of this patent

UNITED STATES PATENTS

| | | |
|---|---|---|
| 2,237,306 | Hood | Apr. 8, 1941 |
| 2,537,932 | Kliever | Jan. 9, 1951 |
| 2,608,345 | Walker | Aug. 26, 1952 |
| 2,660,056 | Schuck | Nov. 24, 1953 |
| 2,688,442 | Droz | Sept. 7, 1954 |
| 2,701,111 | Schuck | Feb. 1, 1955 |
| 2,796,763 | Grosse-Lohmann | June 25, 1957 |
| 2,892,180 | Smith | June 23, 1959 |